US012436687B2

United States Patent
Han et al.

(10) Patent No.: US 12,436,687 B2
(45) Date of Patent: Oct. 7, 2025

(54) PROVIDING DATA STORAGE RESILIENCY (71) Applicant: Dell Products L.P., Round Rock, TX (US)

(72) Inventors: Geng Han, Beijing (CN); Vamsi K. Vankamamidi, Hopkinton, MA (US); Uri Shabi, Tel Mond (IL)

(73) Assignee: Dell Products L.P., Round Rock, TX (US)

( * ) Notice: Subject to any disclaimer, the term of this patent is extended or adjusted under 35 U.S.C. 154(b) by 3 days.

(21) Appl. No.: 18/419,806

(22) Filed: Jan. 23, 2024

(65) Prior Publication Data

US 2025/0238146 A1 Jul. 24, 2025

(51) Int. Cl.
*G06F 3/06* (2006.01)

(52) U.S. Cl.
CPC .......... *G06F 3/0619* (2013.01); *G06F 3/0644* (2013.01); *G06F 3/0659* (2013.01); *G06F 3/0689* (2013.01)

(58) Field of Classification Search
CPC .... G06F 3/0619; G06F 3/0644; G06F 3/0659; G06F 3/0689
See application file for complete search history.

(56) References Cited

U.S. PATENT DOCUMENTS

| | | | |
|---|---|---|---|
| 9,448,735 B1* | 9/2016 | Proulx | G06F 3/0632 |
| 11,442,651 B2 | 9/2022 | Sun et al. | |
| 11,449,402 B2 | 9/2022 | Zhuo et al. | |
| 11,481,275 B2 | 10/2022 | Zhuo et al. | |
| 11,579,976 B2 | 2/2023 | Bono et al. | |
| 2012/0089778 A1* | 4/2012 | Au | G06F 3/0647 711/E12.019 |
| 2016/0259588 A1* | 9/2016 | Vellimalai | G06F 11/1092 |
| 2020/0133503 A1* | 4/2020 | Sun | G06F 3/0689 |
| 2020/0341874 A1* | 10/2020 | Zhuo | G06F 3/0659 |
| 2021/0334030 A1* | 10/2021 | Yang | G06F 3/067 |
| 2022/0137831 A1 | 5/2022 | Dong et al. | |

* cited by examiner

Primary Examiner — Michael Krofcheck
(74) Attorney, Agent, or Firm — BainwoodHuang (57) ABSTRACT

A technique is directed to providing data storage resiliency. The technique includes, after losing access to a storage device that provides storage to a storage extent, performing a degraded write operation that writes data to a first line of the storage extent. The technique further includes setting a first indicator to indicate that the first line was written to while access to the storage device was lost and while a second indicator continues to indicate that a second line of the storage extent was not written to. The technique further includes, after regaining access to the storage device and in response to the first indicator indicating that the first line was written to in the degraded write operation, performing a resiliency operation that constructs additional data from the data written in the first line to increase data storage resiliency of the storage extent.

20 Claims, 7 Drawing Sheets

PROVIDING DATA STORAGE RESILIENCY

BACKGROUND

A conventional data storage system includes multiple storage disks which store data in accordance with a data protection scheme. Example data protection schemes include RAID 5, RAID 6, etc.

If one of the storage disks goes offline while the conventional data storage system is in operation, the conventional data storage system remains capable of storing data in a degraded manner. For example, if a storage disk supporting a storage extent goes offline, the conventional storage system can write to an online part of the storage extent without writing to an offline part of the storage extent. In this manner, the data stored in the offline part becomes outdated.

SUMMARY

Unfortunately, there are deficiencies to the above-described conventional data storage system. Along these lines, when a storage disk that was offline comes back online (e.g., due to a storage disk reset after upgrading the storage disk's firmware), the conventional data storage system obtains and analyzes a significant amount of mapping metadata to locate outdated data.

Consider a situation in which the conventional storage system analyzes a section of a storage extent for outdated data. In this situation, the conventional data storage system loads multiple layers of metadata structures to obtain mapping metadata of physical storage locations in the section. After that, the data storage system then uses the mapping metadata to identify whether the section includes any stale locations. The data storage system then repeats this process for additional sections in the storage extent, regardless of whether the sections contain outdated data. Obtaining and analyzing mapping metadata is a limiting factor in quickly returning the data storage system to normal status.

In contrast to the above-described conventional data storage system, improved techniques are directed to providing data storage resiliency by minimizing the need to access mapping metadata when recovering from lost access to a storage device. Along these lines, when a line of a storage extent is subject to a degraded write operation due to lost access to the storage device, a respective indicator is set to indicate that the line contains a stale position with outdated data. After regaining access to the disk, accessing mapping metadata to locate stale positions is limited to lines with set indicators, avoiding the need to unnecessarily access mapping metadata of lines containing up-to-date data.

One embodiment is directed to a method of providing data storage resiliency. The method includes, after losing access to a storage device that provides storage to a storage extent, performing a degraded write operation that writes data to a first line of the storage extent. The method further includes setting a first indicator to indicate that the first line was written to while access to the storage device was lost and while a second indicator continues to indicate that a second line of the storage extent was not written to. The method further includes, after regaining access to the storage device and in response to the first indicator indicating that the first line was written to in the degraded write operation, performing a resiliency operation that constructs additional data from the data written in the first line to increase data storage resiliency of the storage extent.

Another embodiment is directed to an electronic environment that includes memory and control circuitry coupled with the memory. The memory stores instructions that, when carried out by the control circuitry, cause the control circuitry to perform a method of providing data storage resiliency, the method including:
(A) after losing access to a storage device that provides storage to a storage extent, performing a degraded write operation that writes data to a first line of the storage extent;
(B) setting a first indicator to indicate that the first line was written to while access to the storage device was lost and while a second indicator continues to indicate that a second line of the storage extent was not written to; and
(C) after regaining access to the storage device and in response to the first indicator indicating that the first line was written to in the degraded write operation, performing a resiliency operation that constructs additional data from the data written in the first line to increase data storage resiliency of the storage extent.

Yet another embodiment is directed to a computer program product having a non-transitory computer readable medium that stores a set of instructions to provide data storage resiliency, the set of instructions, when carried out by computerized circuitry, causes the computerized circuitry to perform a method of:
(A) after losing access to a storage device that provides storage to a storage extent, performing a degraded write operation that writes data to a first line of the storage extent;
(B) setting a first indicator to indicate that the first line was written to while access to the storage device was lost and while a second indicator continues to indicate that a second line of the storage extent was not written to; and
(C) after regaining access to the storage device and in response to the first indicator indicating that the first line was written to in the degraded write operation, performing a resiliency operation that constructs additional data from the data written in the first line to increase data storage resiliency of the storage extent.

In some arrangements, performing the resiliency operation includes, in response to the first indicator indicating that the first line was written to while access to the storage device was lost, obtaining a first mapping of storage positions in the first line. The first mapping indicates a degraded storage position in the first line. Additionally, performing the resiliency operation further includes in response to the second indicator indicating that the second line was not written to while access to the storage device was lost, refraining from obtaining a second mapping of storage positions in the second line.

In some arrangements, the method further includes, after losing access to the storage device that provides storage to the storage extent, assigning a first priority level to the storage extent and a second priority level to a second storage extent in which the storage device does not provide storage. The first priority level and the second priority level indicate respective write priorities of the storage extent and the second storage extent to store write data. The first priority level is less than the second priority level. The method further includes, after a number of unused lines in the second storage extent falls below a predetermined threshold, selecting the first line of the storage extent for the degraded write operation.

In some arrangements, performing the degraded write operation includes obtaining a first position bitmap of the first line from a virtual data structure mapped to the first line to identify physical storage positions of the first line. Additionally, performing the degraded write operation further includes, after writing the data to the first line, updating the first position bitmap and a second position bitmap of the first line to indicate that a position of the first line is degraded. The second position bitmap is included in a descriptor of the first line separate from the virtual data structure. Additionally, performing the resiliency operation includes, in response to the first indicator indicating that the first line was written to while access to the storage device was lost, obtaining the second position bitmap from the descriptor of the first line to identify the position of the first line as degraded.

In some arrangements, the descriptor of the first line includes a plurality of pointers to a respective plurality of virtual data structures mapped to the first line. The respective plurality of virtual data structures include the virtual data structure. Further, obtaining the second position bitmap includes accessing the second position bitmap in the descriptor of the first line to construct the additional data for the plurality of virtual data structures mapped to the first line.

In some arrangements, performing the resiliency operation further includes, after regaining access to the position of the first line, updating the first position bitmap in the virtual data structure and the second position bitmap in the descriptor of the first line to indicate that access to the position of the first line has been regained.

In some arrangements, performing the degraded write operation includes, after writing the data to the first line, updating a first generation identifier of the first line to indicate that the data stored in the first line has changed. Additionally, performing the degraded write operation further includes sending an instruction to update a second generation identifier and a third generation identifier. The second generation identifier is stored in a virtual data structure mapped to the first line. The third generation identifier is stored in a descriptor of the first line separate from the virtual data structure.

In some arrangements, performing the resiliency operation includes, in response to the first indicator indicating that the first line was written to while access to the storage device was lost, performing an assessment operation to that compares the first generation identifier and the third generation identifier to confirm data consistency. Additionally, performing the resiliency operation further includes, in response to the assessment operation confirming data consistency, constructing the additional data from the data written in the first line of the storage extent.

In some arrangements, the method further includes, in response to receiving a read request, performing an assessment operation that compares the first generation identifier and the second generation identifier to confirm data consistency. The method further includes, in response to the assessment operation confirming data consistency, reading data from the first line.

This Summary is provided merely for purposes of summarizing some example embodiments so as to provide a basic understanding of some aspects of the disclosure. Accordingly, it will be appreciated that the above-described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

An improved technique is directed to providing data storage resiliency by reducing accesses to mapping metadata when recovering from lost access to a storage device. Along these lines, when a line of a storage extent is subject to a degraded write operation after losing access to the storage device, a respective indicator is set to indicate that the line contains a stale position with outdated data. After regaining access to the disk, accessing mapping metadata to locate stale positions is limited to lines with set indicators, avoiding the need to unnecessarily access mapping metadata of lines containing up-to-date data.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
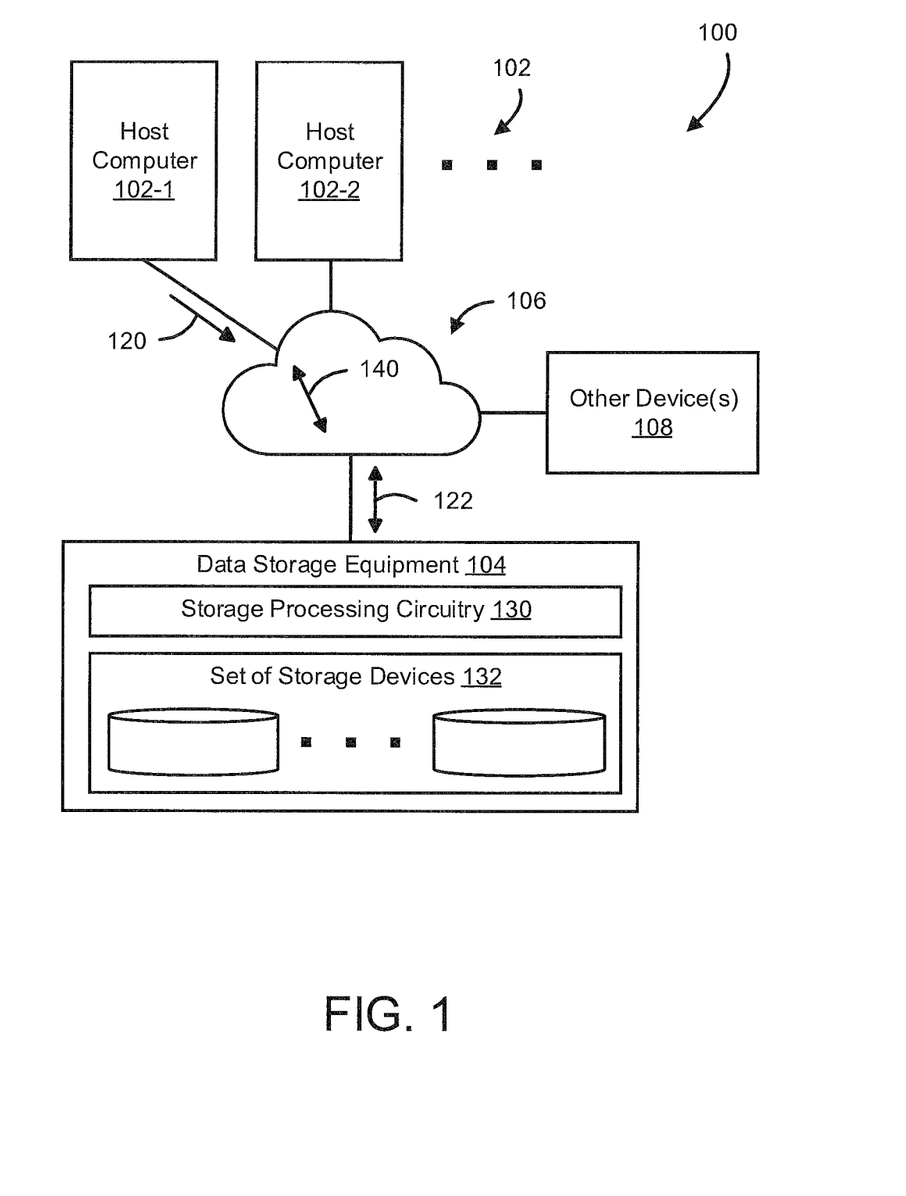
FIG. 1 is a block diagram of an example environment in accordance with certain embodiments.

FIG. 1 shows an example electronic environment 100 that provides storage device management in accordance with certain embodiments. The electronic environment 100 includes host computers 102-1, 102-2, ... (collectively, host computers 102), data storage equipment 104, a communications medium 106, and optionally other devices 108.

Each of the host computers 102 is constructed and arranged to perform useful work. In some embodiments, one or more of the host computers 102 operate as a file server, a web server, an email server, an enterprise server, a database server, a transaction server, combinations thereof, etc. which provide host input/output (I/O) requests 120 to the data storage equipment 104. In some embodiments, the host computers 102 provide a variety of different host I/O requests 120 (e.g., block and/or file-based write commands, block and/or file-based read commands, combinations thereof, etc.) that direct the data storage equipment 104 to richly and reliably store host data 122 within and retrieve the host data 122 from storage (e.g., primary storage or main memory, secondary storage, tiered storage, combinations thereof, etc.).

The data storage equipment 104 (e.g., a storage array, a storage system, etc.) includes storage processing circuitry 130 and a set of storage devices 132.

The storage processing circuitry 130 is constructed and arranged to respond to the host I/O requests 120 from the host computers 102 by writing data into and reading the data from the set of storage devices 132. In some embodiments, the storage processing circuitry 130 includes one or more physical storage processors (SPs) or engines, data movers, director boards, blades, I/O modules, storage device controllers, switches, other hardware, combinations thereof, and so on.

The set of storage devices 132 is constructed and arranged to provide persistent/non-volatile storage in accordance with one or more RAID data protection schemes. In some embodiments, the set of storage devices 132 includes one or more types of storage drives, e.g., non-volatile random access memory (NVRAM) devices, solid state drives (SSDs), hard disk drives (HDDs), combinations thereof, and so on. In some embodiments, at least some of the set of storage devices 132 provides non-volatile storage using a mapped-RAID architecture. Moreover, in accordance with certain embodiments, various physical componentry may be virtualized for additional flexibility, fault tolerance, load balancing, and so on (e.g., virtual data movers, virtual storage devices, etc.).

In some embodiments, the set of storage devices 132 is constructed and arranged to store data in lines of storage extents. In some embodiments, the storage extents are ubers having a particular RAID configuration (e.g., RAID 1, RAID 5, RAID 6, RAID 10, combinations thereof, etc.). In some embodiments, the lines are physical large blocks (PLBs) that have a fixed size of storage for storing user data (e.g., 2 MB (megabytes), 4 MB, etc.). In some embodiments, the PLBs have additional storage for parity data (e.g., 1 MB, 2 MB, etc.). In some embodiments, PLBs represent a minimal write size to write data to the set of storage devices 132. In some embodiments, each of the PLBs spans multiple storage devices.

The communications medium 106 is constructed and arranged to connect the various components of the electronic environment 100 together to enable these components to exchange electronic signals 140 (e.g., see the double arrow 140). At least a portion of the communications medium 106 is illustrated as a cloud to indicate that the communications medium 106 is capable of having a variety of different topologies including backbone, hub and spoke, loop, irregular, combinations thereof, and so on. Along these lines, the communications medium 106 may include copper-based data communications devices and cabling, fiber optic devices and cabling, wireless devices, combinations thereof, etc. Furthermore, the communications medium 106 is capable of supporting LAN-based communications, SAN-based communications, cellular communications, WAN-based communications, distributed infrastructure communications, other topologies, combinations thereof, etc.

The other devices 108 represent other possible componentry of the electronic environment 100. Along these lines, the other devices 108 may include remote data storage equipment that provides data to and/or receives data from the data storage equipment 104 (e.g., replication arrays, backup and/or archiving equipment, service processors and/or management/control devices, combinations thereof, etc.).

During operation and as will be explained in further detail shortly, the storage processing circuitry 130 is constructed and arranged to perform a degraded write operation after losing access to a storage device in the set of storage devices 132. The degraded write operation writes data to a partial portion of a PLB of an uber. After writing the data, the storage processing circuitry 130 sets an indicator to indicate that the PLB contains outdated data. After regaining access to the storage device and in response to the indicator indicating the line contains outdated data, the storage processing circuitry 130 performs a resiliency operation to replace the outdated data with current data. In some embodiments, the resiliency operation constructs the current data using data written to the PLB in the degraded write operation (e.g., by calculating parity and/or user data from data written to the PLB).

Advantageously, setting respective indicators when degraded lines are written to enables the storage processing circuitry 130 to quickly identify the PLBs as storing outdated data without otherwise needing to perform more computationally expensive operations of obtaining and analyzing mapping metadata for every PLB in the uber. Once the storage processing circuitry 130 identifies the PLBs storing outdated data, the storage processing circuitry 130 then accesses the mapping metadata of only those PLBs to increase resiliency. In this manner, the set of storage devices 132 recover from a degraded state more quickly, reducing a window in which data loss is more likely. Further details will now be provided with reference to FIG. 2.

Figure 2:
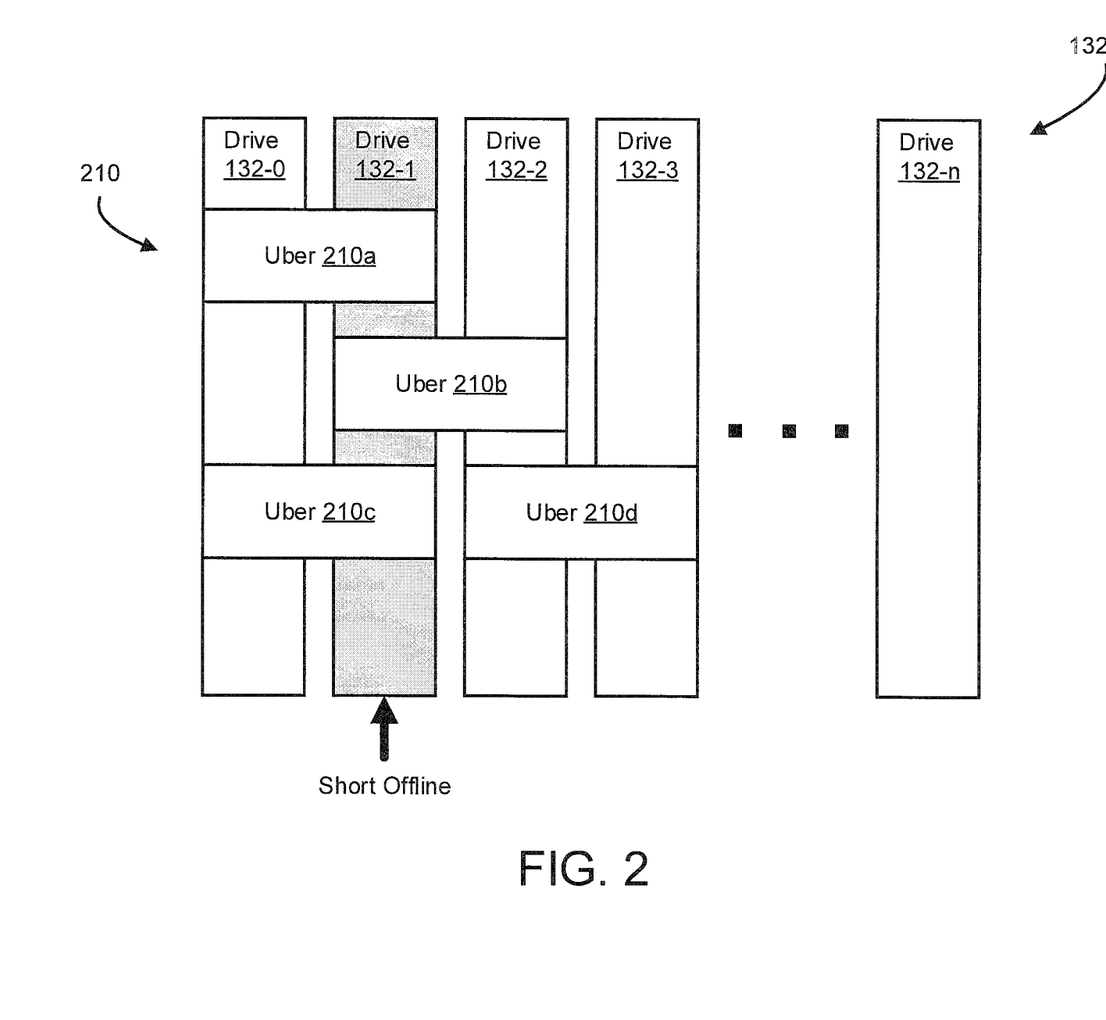
FIG. 2 is a block diagram of storage extents in a set of storage devices in accordance with certain embodiments.

FIG. 2 is a block diagram illustrating further details of the set of storage devices 132 (FIG. 1) in accordance with certain embodiments. As shown, the set of storage devices 132 includes storage devices 132-0, . . . , 132-n that provide storage to ubers 210a, . . . , 210d (collectively, ubers 210). Ubers 210 are constructed and arranged in accordance with one or more RAID data protection schemes (e.g., RAID 1, RAID 5, RAID 6, RAID 10, combinations thereof, etc.).

It should be understood that FIG. 2 is provided for example purposes, and in some embodiments, the set of storage devices 132 includes more or fewer storage devices, more or fewer ubers, combinations thereof, etc. Additionally, in some embodiments, the ubers include storage from different amounts of drives, have different RAID configurations, combinations thereof, etc. For example, in some embodiments, the set of storage devices 132 provides 64 GB (gigabytes) of user data storage and 32 GB of parity data storage to respective ubers configured as RAID 6(4+2).

During operation, the storage processing circuitry 130 writes data to lines of the ubers 210. In some embodiments, the storage processing circuitry 130 performs a degraded write operation to write to PLBs of an uber while one or more storage devices supporting the uber is offline.

For example, suppose that the storage processing circuitry 130 receives an instruction to write data to a PLB of uber 210a while storage device 132-1 is temporarily offline (e.g., due to a reset during a firmware upgrade). In this situation, the storage processing circuitry 130 performs a degraded write operation to write data to online storage positions of the PLB (e.g., storage positions in storage device 132-0) without writing to offline storage positions of the PLB (e.g., storage positions in storage device 132-1). Further, the storage processing circuitry 130 sets an indicator to indicate that the PLB was written to in the degraded write operation, which indicates that the PLB contains outdated data. After regaining access to the storage device 132-1, the storage processing circuitry 130 locates set indicators to identify PLBs that contain outdated data and performs a resiliency operation to replace the outdated data with current data. Further details will now be provided with reference to FIG. 3.

Figure 3:
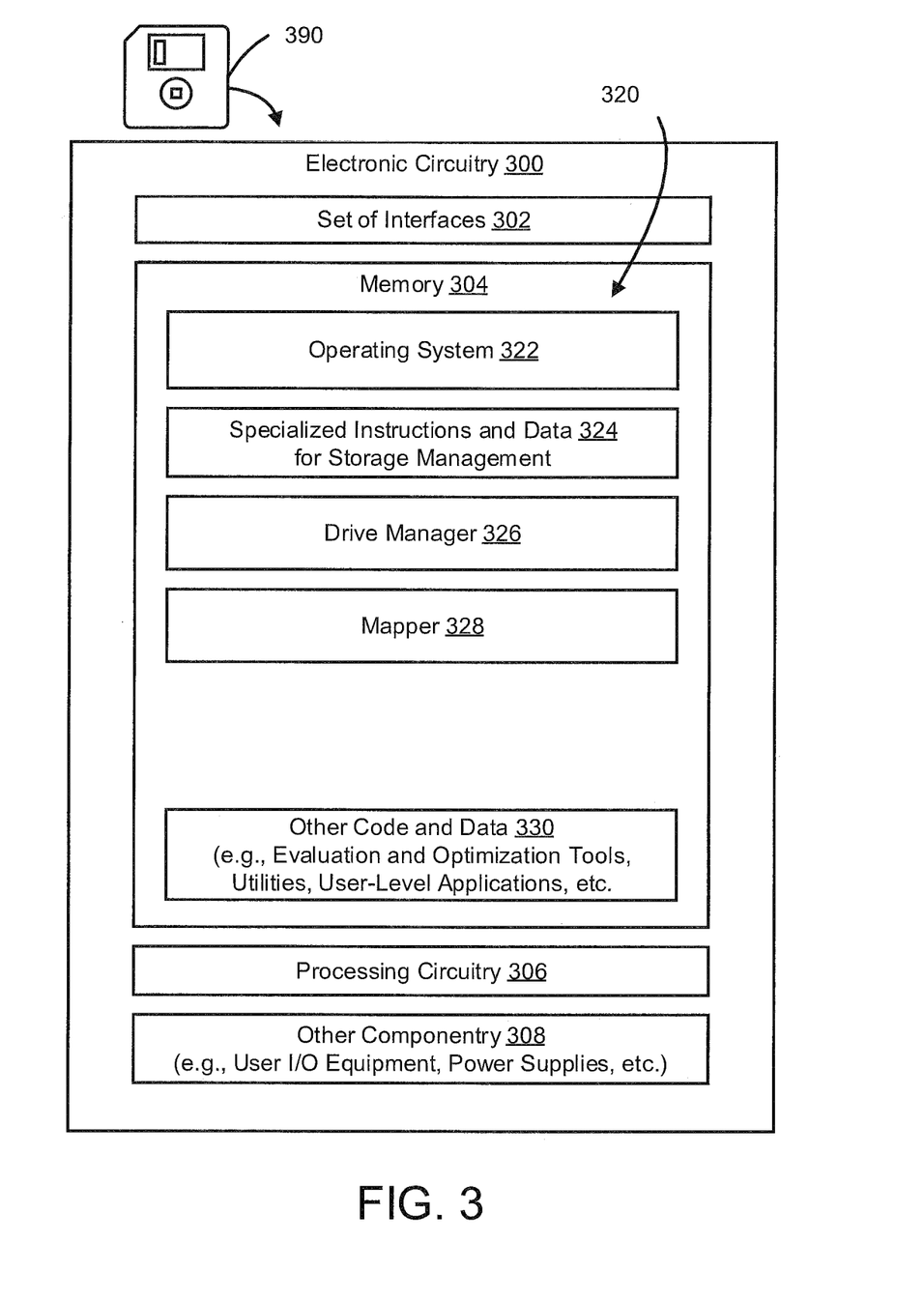
FIG. 3 is a block diagram of electronic circuitry in accordance with certain embodiments.

FIG. 3 is a block diagram of electronic circuitry 300 which is suitable for at least a portion of the data storage equipment 104 (FIG. 1) in accordance with certain embodiments. The electronic circuitry 300 includes a set of interfaces 302, memory 304, processing circuitry 306, and other componentry 308.

The set of interfaces 302 is constructed and arranged to connect the electronic circuitry 300 to the communications medium 106 to enable communications with other devices in the electronic environment 100 (e.g., the host computers 102). In some embodiments, the communications are IP-based, SAN-based, cellular-based, cable-based, fiber-optic-based, wireless, cloud-based, combinations thereof, etc. Additionally, the set of interfaces 302 is constructed and arranged to connect the electronic circuitry 300 to other local equipment such as the set of storage devices 132. In some embodiments, the set of interfaces 302 includes one or more host interfaces (e.g., a computer network interface, a fibre-channel interface, etc.), one or more storage device interfaces (e.g., a host adapter or HBA, etc.), and other interfaces. As a result, the set of interfaces 302 enables the electronic circuitry 300 to robustly and reliably communicate with various apparatus.

The memory 304 includes both volatile storage (e.g., DRAM, SRAM, etc.) and non-volatile storage (e.g., flash memory, magnetic memory, etc.). The memory 304 stores a variety of software constructs 320 including an operating system 322, specialized instructions and data 324, a drive manager 326, a mapper 328, and other code and data 230.

The operating system 322 refers to particular control code such as a kernel to manage computerized resources (e.g., processor cycles, memory space, etc.), the I/O stack (e.g., drivers), and so on. The specialized instructions and data 324 refer to particular instructions for storage management. In some arrangements, the specialized instructions and data 324 are tightly integrated with or part of the operating system 322 itself.

The drive manager 326 is constructed and arranged to manage data in the set of storage devices 132. In some embodiments, the drive manager 326 manages the ubers 210 (FIG. 2) which include respective pluralities of PLBs. In some embodiments, the drive manager 326 writes data to particular physical storage locations in the set of storage devices 132. In some embodiments, the drive manager 326 further manages a respective indicator for each PLB in an uber. In these embodiments, the drive manager 326 is constructed and arranged to set the respective indicator if the drive manager 326 writes to a PLB while the PLB is degraded.

The mapper 328 is constructed and arranged to map logical address space to physical address space. In some embodiments, the mapper 328 stores respective virtual large blocks (VLBs) mapped to a PLB 410 in the uber 210. In some embodiments, each VLB is a respective virtual data structure spanning a contiguous portion of logical address space. In some embodiments, the mapper 328 stores 8 VLBs per PLB. In some embodiments, the mapper 328 further stores a PLB descriptor for each PLB managed by the drive manager 326. In these embodiments, each PLB descriptor includes pointers to the VLBs mapped to the respective PLB.

The other code and data 330 include applications and routines to provide additional operations and services (e.g., performance measurement tools, etc.), user-level applications, administrative tools, utilities, and so on.

During operation and as will be described in further detail shortly, the drive manager 326 and the mapper 328 communicate with each other to perform data storage operations. For example, suppose the mapper 328 receives a write request to write data in the set of storage devices 132. The mapper 328 then instructs the drive manager 326 to store the write data in a particular PLB of an uber.

Further suppose that a storage device providing storage to the particular PLB is offline, resulting in a degraded write operation that writes to only part of the PLB. In response, the drive manager 326 sets a respective indicator of the PLB to indicate that the PLB stores outdated data. Upon regaining access to the storage device, the drive manager 326 locates indicators that are set to identify the respective PLBs that store outdated data, enabling the mapper 328 to avoid loading mapping metadata of unaffected PLBs in the uber. Further details will now be provided with reference to FIG. 4.

Figure 4:
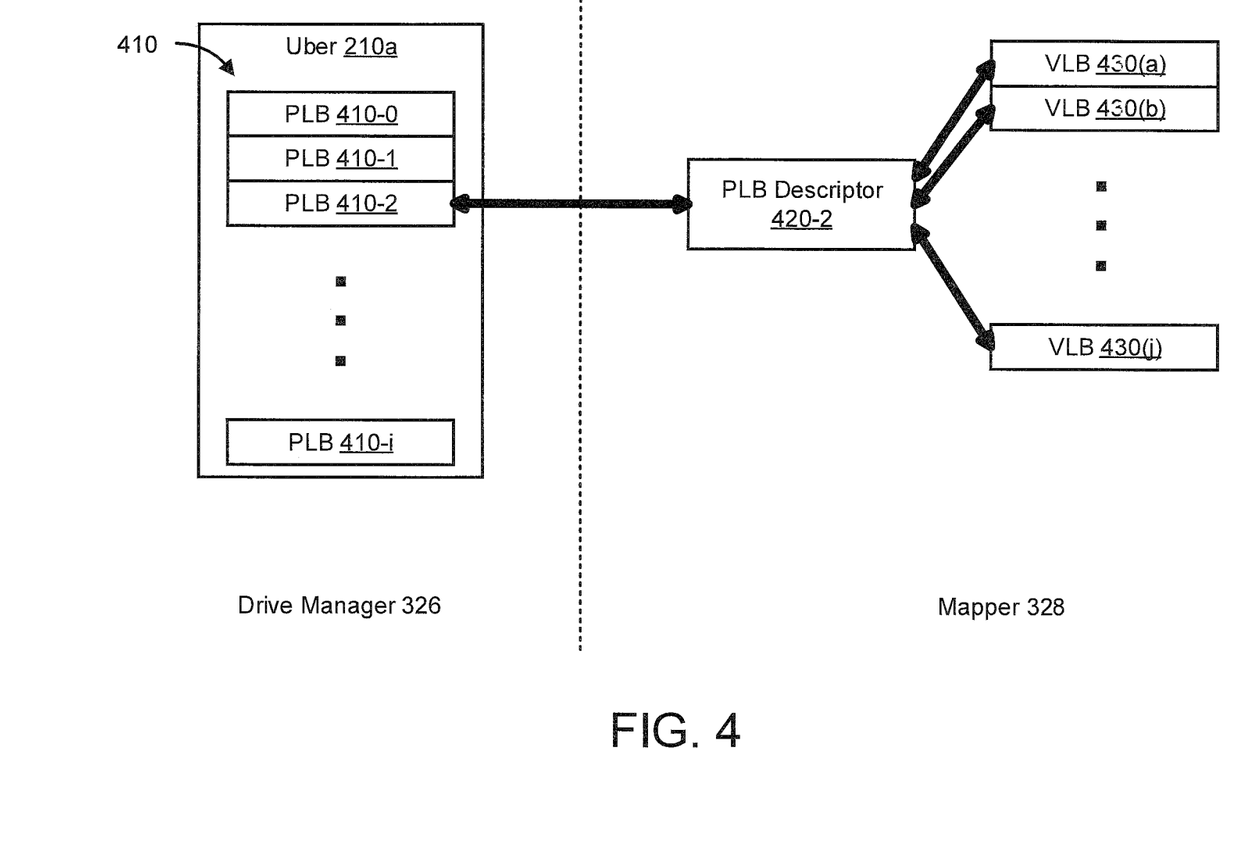
FIG. 4 is a block diagram illustrating storage management in accordance with certain embodiments.

FIG. 4 is a block diagram illustrating additional features of the drive manager 326 and the mapper 328 (FIG. 3) in accordance with certain embodiments.

As described above, the drive manager 326 is constructed and arranged to manage the ubers 210. FIG. 4 shows only one uber (i.e., uber 210a) for simplicity. The uber 210a includes PLBs 410-0, . . . , 410-i (collectively, PLBs 410). In some embodiments, each of the PLBs 410 is a respective line of the uber 210a and includes storage of multiple storage devices in the set of storage devices 132.

As described above, the mapper 328 is constructed and arranged to map logical address space to physical address space. Along these lines, the mapper 328 stores PLB descriptors of respective PLBs, and additionally stores VLBs mapped to the PLBs. For simplicity, FIG. 4 shows only one PLB descriptor (i.e., PLB descriptor 420-2 of the respective PLB 410-2). The PLB descriptor 420-2 points to VLBs 430(a), . . . , 430(j) (collectively, VLBs 430) mapped to the PLB 410-2.

During operation, the drive manager 326 and the mapper 328 access various features to read data from and write data to the set of storage devices 132. For example, when performing a resiliency operation to increase resiliency of the PLB 410-2, the mapper 328 obtains mapping information stored in the PLB descriptor 420-2 to identify stale storage positions in the PLB 410-2. Advantageously, by storing the mapping information in the PLB descriptor 420-2, the mapper 328 avoids needing to load the VLBs 430 to increase the resiliency of the PLB 410-2.

In another example, during a read-miss, the mapper 328 accesses mapping information stored in the VLBs 430 to locate data stored in the PLB 410-2. In some embodiments, the mapper 328 reads data from the PLB 410-2 without accessing mapping information in the PLB descriptor 420-2. In some embodiments, the mapping information stored in the VLBs 430 and the mapping information stored in the PLB descriptor 420-2 is the same. Further details will now be provided with reference to FIG. 5.

Figure 5:
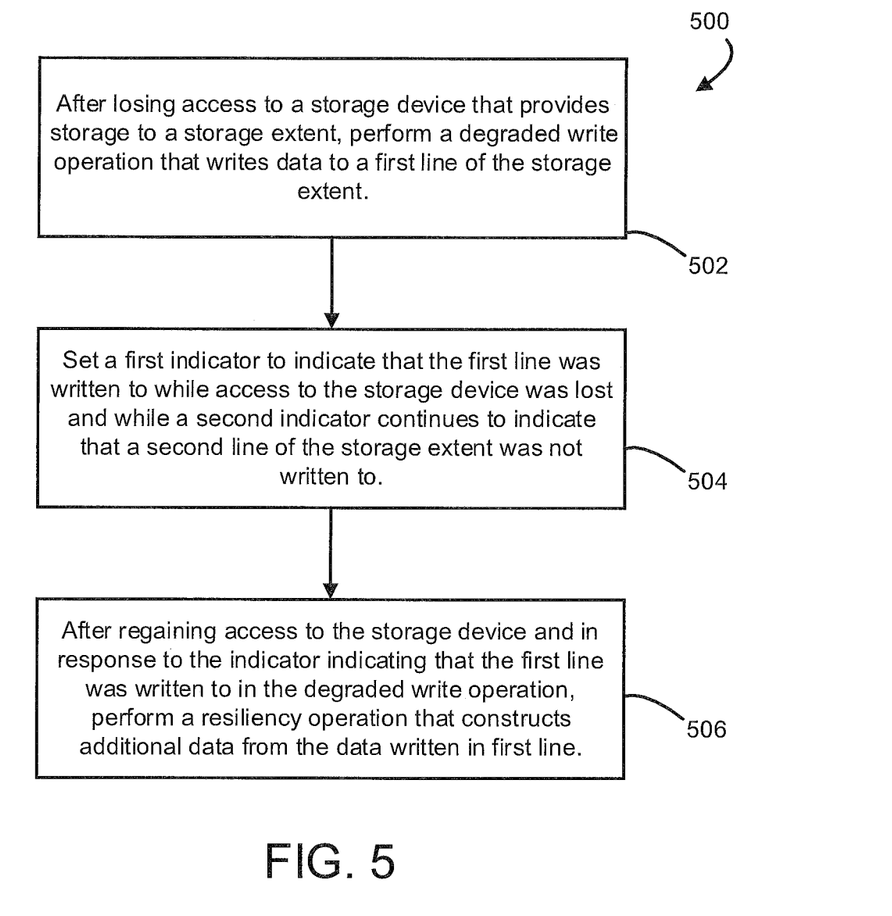
FIG. 5 is a flowchart of a procedure that is performed by specialized equipment in accordance with certain embodiments.

FIG. 5 is a flowchart of a procedure 500 which is performed by specialized equipment in accordance with certain embodiments. The procedure 500 carries out a method of providing data storage resiliency in the electronic environment 100.

At 502, the drive manager 326 performs a degraded write operation to write data to a first line of a storage extent. In some embodiments, the degraded write operation involves writing data to one or more online storage positions in the first line without writing to one or more offline storage positions in the first line. In some embodiments, the degraded write operation occurs after losing access to a storage device that provides storage to the storage extent, including the first line. In some embodiments, the drive manager 326 writes the data in response to an instruction from the mapper 328 to write to the first line.

In some embodiments, the mapper 328 tracks lines that are affected by the lost access to the storage device. For example, in some embodiments, when the storage device in the set of storage devices 132 goes offline, the drive manager 326 generates a list of degraded ubers and provides the list to the mapper 328. In these embodiments, the mapper 328 prioritizes unaffected (undegraded) lines over affected (degraded) lines. Along these lines, in some embodiments, the mapper 328 selects the first line for the degraded write operation after a number of unused undegraded lines falls below a predetermined threshold. It should be understood that writing data to an undegraded line, rather than a degraded line, avoids the need to perform a resiliency operation to increase resiliency upon regaining access the storage device.

At 504, the drive manager 326 sets a first indicator to indicate that the first line was written to in the degraded write operation. In some embodiments, the drive manager 326 manages a plurality of indicators for a respective plurality of lines in the storage extent. By setting the first indicator without setting a second indicator, the drive manager 326 distinguishes between lines that store outdated data (e.g., the first line) from lines that still store up-to-date data (e.g., a second line of the second indicator).

At 506, the drive manager 326 and the mapper 328 perform a resiliency operation that constructs additional data from the data written in the first line to increase data storage resiliency of the storage extent. In this example, the resiliency operation occurs after regaining access to the storage device and in response to the first indicator indicating that the first line was written to in the degraded write operation. In some embodiments, the resiliency operation constructs the additional data using data written to the line in the degraded write operation (e.g., by calculating parity and/or user data from data written to the line).

In some embodiments, when performing the resiliency operation, the mapper 328 refrains from accessing position mapping metadata of lines having unset indicators (e.g., the second line). Advantageously, refraining from accessing mapping metadata of lines having unset indicators reduces a total number of metadata loading operations needed to return the storage extent to normal state. In this manner, the storage extent recovers from a degraded state more quickly, reducing a window in which data loss is more likely. Further details will now be provided with reference to FIG. 6.

Figure 6:
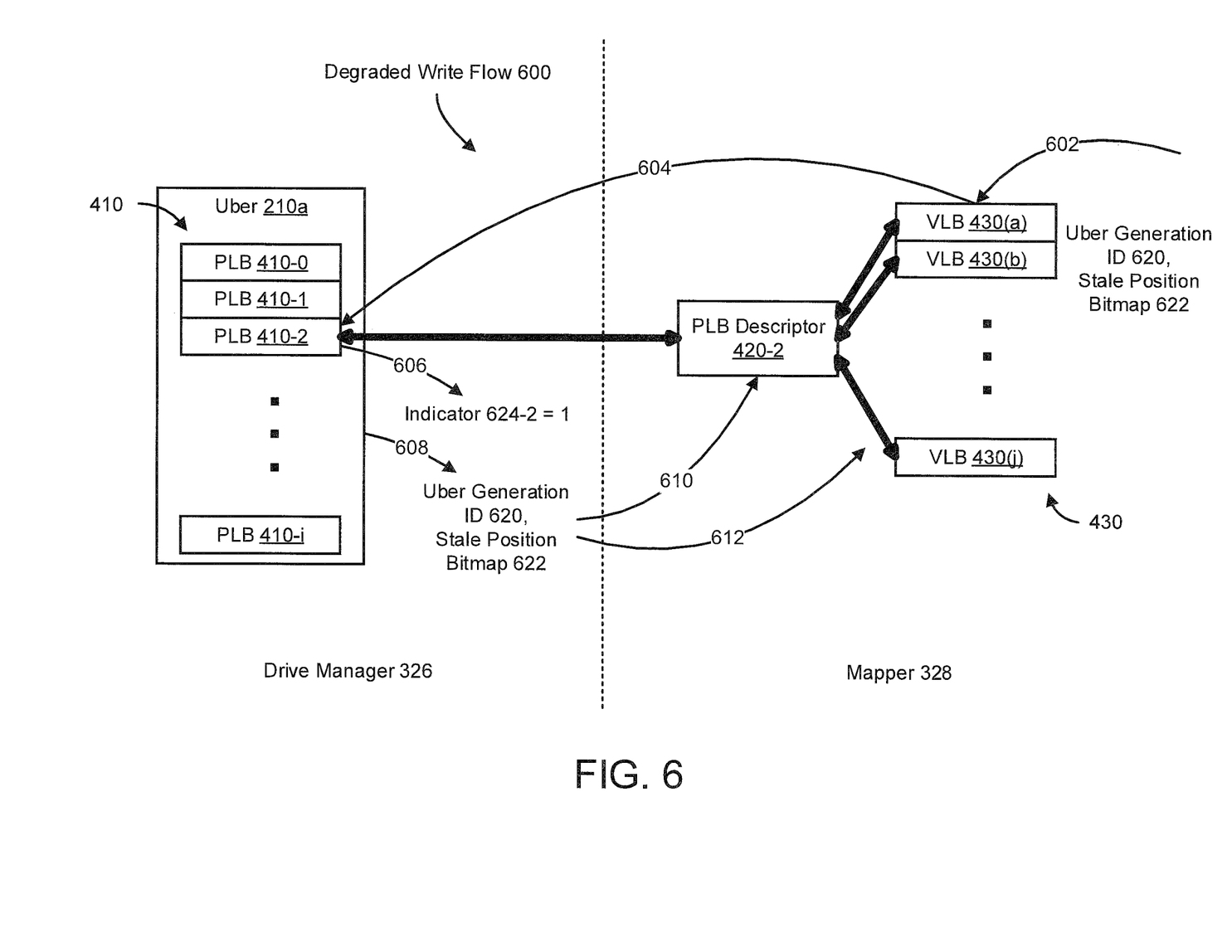
FIG. 6 is a block diagram illustrating a degraded write operation in accordance with certain embodiments.

FIG. 6 is a block diagram illustrating a degraded write flow 600 performed in the electronic environment 100 (FIG. 1) in accordance with certain embodiments.

At 602, the mapper 328 receives a write request and selects the PLB 410-2 of the uber 210a to store write data of the write request. Along these lines, the mapper 328 loads the VLB 430(a) mapped to the PLB 410-2 to access a copy of an uber generation identifier 620 of the uber 210a. The uber generation identifier 620 is used to maintain data consistency between the mapper 328 and the drive manager 326. For example, in some embodiments, the mapper 328 compares its copy of the uber generation identifier 620 to a respective copy of the uber generation identifier 620 maintained by the drive manager 326. If the respective copies match, the drive information stored in the mapper 328 is up-to-date and the write operation proceeds to step 604.

In some embodiments, the mapper 328 further loads a stale position bitmap 622 of the PLB 410-2. The stale position bitmap 622 is an array of bits that indicates offline (stale) storage positions in the PLB 410-2. In some embodiments, the mapper 328 prioritizes PLBs that do not contain stale positions over PLBs that contain stale positions.

At 604, the mapper 328 instructs the drive manager 326 to write the data to the PLB 410-2. As the PLB 410-2 is currently degraded, the drive manager 326 writes data to only online storage positions in the PLB 410-2 and refrains from writing to the offline storage positions.

At 606, the drive manager 326 sets an indicator 624-2 to indicate that the PLB 410-2 was written to in the degraded write operation. In some embodiments, the drive manager 326 maintains respective indicators 624 for the PLBs 410 in the uber 210a. In some embodiments, the drive manager 326 generates the indicators 624 upon detecting that the storage device supporting uber 210a has gone offline. In some embodiments, the drive manager 326 provides the indicators 624 as a bitmap (e.g., one bit per PLB in the uber 210a). In some embodiments, the drive manager 326 allocates 4 KB of memory for an uber constructed and arranged to store 64 GB of user data. In some embodiments, the indicators 624 are stored in volatile memory and erased after the uber 210a is returned to an undegraded state.

At 608, the drive manager 326 updates its copy of the uber generation identifier 620 and the stale position bitmap 622. In some embodiments, the uber generation identifier 620 is a number indicating a current generation of the uber 210a. In these embodiments, updating the uber generation identifier 620 includes incrementing the number indicating the current generation of the uber 210a.

At 610, the drive manager 326 instructs the mapper 328 to store the updated uber generation identifier 620 and the updated stale position bitmap 622 in the PLB descriptor 420-2. As will be described in further detail shortly, in some embodiments, storing the uber generation identifier 620 and the stale position bitmap 622 in the PLB descriptor 420-2 enables a reduction in a total amount of data loading when increasing the resiliency of the PLB 410-2. Along these lines, when increasing the resiliency of the PLB 410-2, the mapper 328 loads the PLB descriptor 420-2 to access the uber generation identifier 620 and the stale position bitmap 622 without otherwise needing to load the VLBs 430. In this manner, storing the uber generation identifier 620 and the stale position bitmap 622 in the PLB descriptor 420-2 increases the speed at which the uber 210a returns to normal operation after regaining access to a previously offline storage device.

At 612, the drive manager 326 instructs the mapper 328 to further store the updated uber generation identifier 620 and the updated stale position bitmap 622 in the VLBs 430. In this manner, the VLBs 430 store a current status of the PLB 410-2 for future I/O requests. It should be understood that, in some embodiments, the mapper 328 loads the VLBs 430 to obtain the uber generation identifier 620 and stale position bitmap 622 without loading the PLB descriptor 420-2 (e.g., in response to a read-miss, etc.). Further details will now be provided with reference to FIG. 7.

Figure 7:
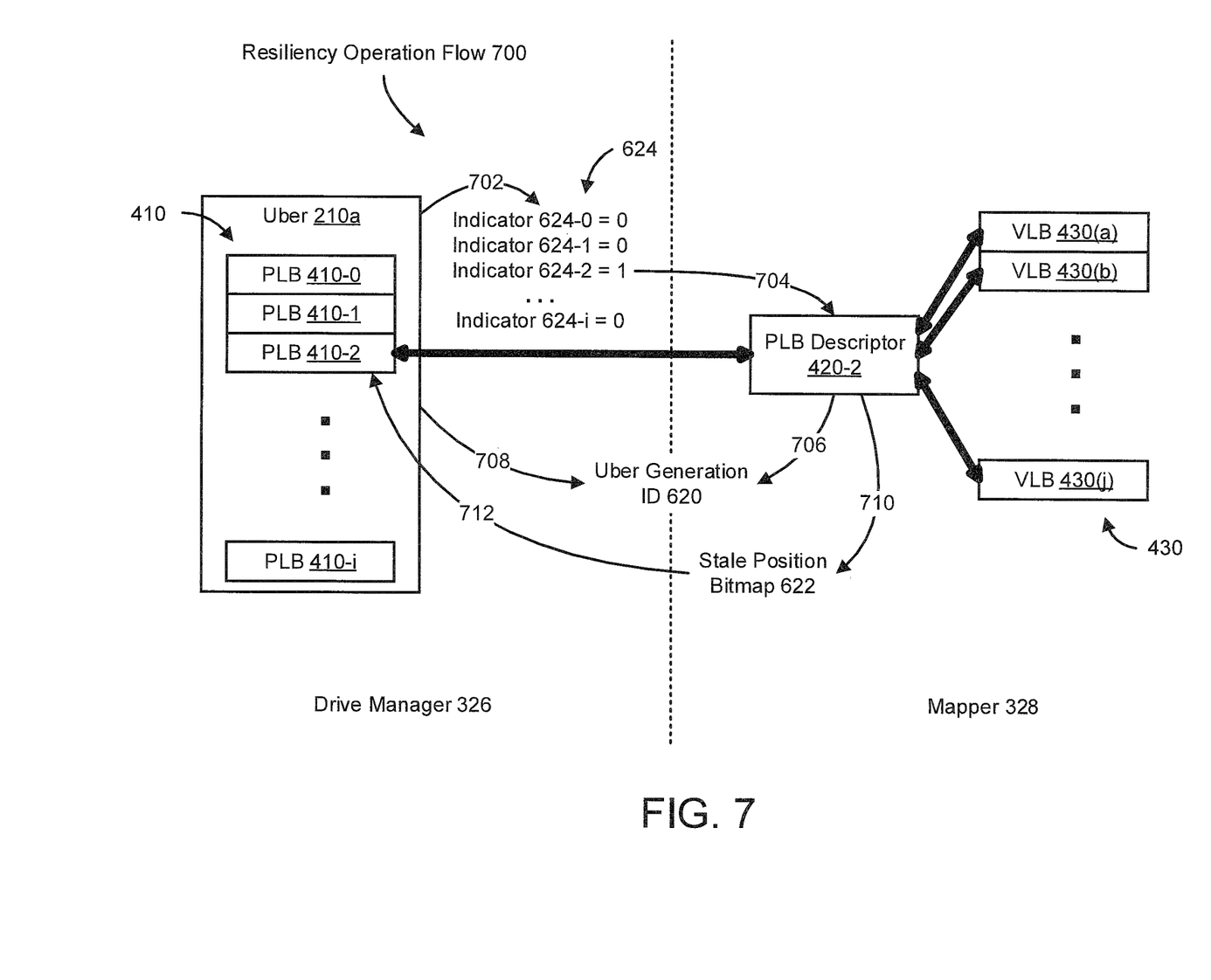
FIG. 7 is a block diagram illustrating a resiliency operation in accordance with certain embodiments.

FIG. 7 is a block diagram illustrating a data resiliency operation 700 performed in the electronic environment 100 (FIG. 1) in accordance with certain embodiments.

At 702, after the drive manager 326 regains access to the storage device 132-1, the drive manager 326 locates any PLBs storing outdated data. Along these lines, the drive manager 326 scans the indicators 624 for any set indicators. In the example shown in FIG. 7, the drive manager 326 identifies the indicator 624-2 of PLB 410-2 as being set.

At 704, the drive manager 326 provides the identified PLBs to the mapper 328. For example, as shown, the drive manager 326 identifies PLB 410-2 as storing outdated data due to the respective identifier 624-2 being set.

At 706, the mapper 328 obtains the uber generation identifier 620 stored in the PLB descriptor 420-2. It should be appreciated that, in some embodiments, the mapper 328 refrains from loading the VLBs 430, which also store the uber generation identifier 620, when performing the data resiliency operation. In these embodiments, accessing the VLBs 430 would involve first loading the PLB descriptor 420-2 to obtain respective pointers to the VLBs 430, and then loading the VLBs 430 to obtain the uber generation identifier 620. In contrast, storing the uber generation identifier 620 directly in the PLB descriptor 420-2 enables the mapper 328 to avoid these additional loading operations.

At 708, the drive manager 326 and the mapper 328 compare respective copies of the uber generation identifier 620 to confirm that the mapper 328 contains up-to-date information. If the respective copies match, the data resiliency operation proceeds to step 710.

At 710, the mapper 328 obtains and analyzes the stale position bitmap 622 from the PLB descriptor 420-2 to locate stale positions in the PLB 410-2. It should be understood that obtaining the stale position bitmap 622 directly from the PLB descriptor 420-2, rather than the VLBs 430, enables similar benefits to those described above in connection with the uber generation identifier 620 in step 706 (e.g., avoiding additional loading operations, etc.).

At 712, the mapper 328 directs the drive manager 326 to generate additional data for the stale position in the PLB 410-2. In this manner, the uber 210a returns to an undegraded state without needing to load the VLBs 430.

As described above, improved techniques are directed to providing data storage resiliency by minimizing the loading of mapping metadata when recovering from lost access to a storage device. Along these lines, when a line of a storage extent is subject to a degraded write operation after losing access to the storage device, a respective indicator is set to indicate that the line contains a stale position with outdated data. After regaining access to the disk, accessing mapping metadata to locate stale positions is limited to lines with set indicators, avoiding the need to unnecessarily access mapping metadata of lines containing up-to-date data.

One should appreciate that the above-described techniques do not merely collect and store data. Rather, the disclosed techniques are directed to increasing data resiliency of data stored in a set of storage devices. Accordingly, such techniques enable faster recovery from lost access to a storage device.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the example environment 100 such as the data storage equipment 106, etc. are capable of being implemented in or "moved to" the cloud, i.e., to remote computer resources distributed over a network. Here, the various computer resources may be distributed tightly (e.g., a data storage system in a single facility) or over relatively large distances (e.g., over a campus, in different cities, coast to coast, etc.). In these situations, the network connecting the resources is capable of having a variety of different topologies including backbone, hub and spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN based communications, combinations thereof, and so on.

When a drive is temporarily taken offline and subsequently reconnected on a storage system, certain data stored on that drive may become outdated. To address this situation, fast rebuild (also referred to as incremental rebuild) is employed to recover the outdated data.

One typical scenario in which fast rebuild occurs is during drive firmware upgrades. When a drive undergoes firmware upgrading, it temporarily goes offline for a period of several tens of seconds before coming back online once the upgrade process is completed. Subsequently, fast rebuild is initiated to replace outdated data on this particular drive. This process is repeated for each drive in the storage system until all drives have their firmware updated. The duration of the entire process is directly proportional to the number of drives in the system. In systems with fully populated enclosures, this process can last for multiple days, resulting in a vulnerable window where any drive failure may end up with data lost. Customers are advised to minimize their workload during this window. The size of the vulnerable window largely depends on the performance of the fast rebuild operation. Enhancing the fast rebuild performance can help reduce the window size, thereby minimizing the impact on business operations.

Some embodiments provide indicators in an in-memory bitmap of each degraded uber so that unaffected data regions in the uber could be skipped more efficiently without consulting the persisted metadata in mapper. These embodiments reduce the mapper metadata loading overhead by skipping unaffected areas in the uber. In some embodiments, by allocating 4 KB of memory for a 64 GB size mapper user data uber, some embodiments achieve PLB (2 MB) level resolution.

In some embodiments, only the degraded ubers allocate memory for the indicators. In these embodiments, the total number of degraded ubers is limited by the maximum number of drives that the system can tolerate losing and the maximum drive capacity. In some embodiments, the indicators are not stored permanently. Therefore, in some embodiments, the persisted stale position bitmap and uber generation ID in VLBs are still be maintained in the event of a high availability (HA) occurrence, e.g., to avoid the loss of fast rebuild capability when the system reboots.

In some embodiments, when a drive is offline, the drive manager generates a list of degraded ubers and inform this list to the mapper. In these embodiments, the mapper avoids allocating PLBs from those degraded ubers if alternative options exist. This approach substantially minimizes the number of affected ubers that require fast rebuild processes.

Some embodiments store separate copies of a stale position bitmap and a uber generation ID to PLB descriptor and the individual VLBs. In some embodiments, the mapper read-miss flow obtains the stale position bitmap and the uber generation ID from individual VLBs. In some embodiments, PLB descriptors are loaded all together in the fast rebuild process instead of loading VLBs individually.

In some embodiments, when the mapper writes a PLB, the uber generation ID along with the stale position of the uber will be updated to the PLB descriptor and all the VLBs associated with the PLB. In some embodiments, the drive manager also remembers the latest uber generation ID in its database. In some embodiments, the drive manager increases its copy of the uber generation ID by 1 once the uber is fixed which means rebuilding of the uber has been done. After this point, the persisted stale position bitmap in VLBs and PLB descriptors are out-of-date and no longer meaningful. The persisted stale position bitmap is then updated.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of providing data storage resiliency, the method comprising:
   after losing access to a storage device that provides storage to a storage extent, performing a degraded write operation that writes data to a first line of the storage extent;
   setting a first indicator to indicate that the first line was written to while access to the storage device was lost and while a second indicator continues to indicate that a second line of the storage extent was not written to; and
   after regaining access to the storage device and in response to the first indicator indicating that the first line was written to in the degraded write operation, performing a resiliency operation that constructs additional data from the data written in the first line to increase data storage resiliency of the storage extent;
   wherein performing the degraded write operation includes:
      updating a first generation identifier of the first line to indicate that the data stored in the first line has changed; and
      sending an instruction to update a second generation identifier and a third generation identifier, the second generation identifier being stored in a virtual data structure mapped to the first line, the third generation identifier being stored in a descriptor of the first line separate from the virtual data structure.

2. The method of claim 1 wherein performing the resiliency operation includes:
   in response to the first indicator indicating that the first line was written to while access to the storage device was lost, obtaining a first mapping of storage positions in the first line, the first mapping indicating a degraded storage position in the first line; and
   in response to the second indicator indicating that the second line was not written to while access to the storage device was lost, refraining from obtaining a second mapping of storage positions in the second line.

3. The method of claim 1, further comprising:
   after losing access to the storage device that provides storage to the storage extent, assigning a first priority level to the storage extent and a second priority level to a second storage extent in which the storage device does not provide storage, the first priority level and the second priority level indicating respective write priorities of the storage extent and the second storage extent to store write data, the first priority level being less than the second priority level; and
   after a number of unused lines in the second storage extent falls below a predetermined threshold, selecting the first line of the storage extent for the degraded write operation.

4. The method of claim 1 wherein performing the degraded write operation includes:
   obtaining a first position bitmap of the first line from a virtual data structure mapped to the first line to identify physical storage positions of the first line; and
   after writing the data to the first line, updating the first position bitmap and a second position bitmap of the first line to indicate that a position of the first line is degraded, the second position bitmap being included in a descriptor of the first line separate from the virtual data structure; and
   wherein performing the resiliency operation includes:
      in response to the first indicator indicating that the first line was written to while access to the storage device was lost, obtaining the second position bitmap from the descriptor of the first line to identify the position of the first line as degraded.

5. The method of claim 4, wherein the descriptor of the first line includes a plurality of pointers to a respective plurality of virtual data structures mapped to the first line, the respective plurality of virtual data structures including the virtual data structure; and
   wherein obtaining the second position bitmap includes:
      accessing the second position bitmap in the descriptor of the first line to construct the additional data for the plurality of virtual data structures mapped to the first line.

6. The method of claim 4 wherein performing the resiliency operation further includes:
   after regaining access to the position of the first line, updating the first position bitmap in the virtual data structure and the second position bitmap in the descriptor of the first line to indicate that access to the position of the first line has been regained.

7. The method of claim 1 wherein updating the first generation identifier occurs after writing the data to the first line.

8. The method of claim 7 wherein performing the resiliency operation includes:
   in response to the first indicator indicating that the first line was written to while access to the storage device was lost, performing an assessment operation to that compares the first generation identifier and the third generation identifier to confirm data consistency; and
   in response to the assessment operation confirming data consistency, constructing the additional data from the data written in the first line of the storage extent.

9. The method of claim 7 further comprising:
   in response to receiving a read request, performing an assessment operation that compares the first generation identifier and the second generation identifier to confirm data consistency; and
   in response to the assessment operation confirming data consistency, reading data from the first line.

10. An electronic environment, comprising:
    a plurality of storage devices;
    memory; and
    control circuitry coupled with the memory, the memory storing instructions that, when carried out by the control circuitry, cause the control circuitry to perform a method of providing data storage resiliency, the method including:

after losing access to a storage device that provides storage to a storage extent, performing a degraded write operation that writes data to a first line of the storage extent;

setting a first indicator to indicate that the first line was written to while access to the storage device was lost and while a second indicator continues to indicate that a second line of the storage extent was not written to; and after regaining access to the storage device and in response to the first indicator indicating that the first line was written to in the degraded write operation, performing a resiliency operation that constructs additional data from the data written in the first line to increase data storage resiliency of the storage extent;

wherein performing the degraded write operation includes:

updating a first generation identifier of the first line to indicate that the data stored in the first line has changed; and sending an instruction to update a second generation identifier and a third generation identifier, the second generation identifier being stored in a virtual data structure mapped to the first line, the third generation identifier being stored in a descriptor of the first line separate from the virtual data structure.

11. The electronic environment of claim 10 wherein performing the resiliency operation includes:

in response to the first indicator indicating that the first line was written to while access to the storage device was lost, obtaining a first mapping of storage positions in the first line, the first mapping indicating a degraded storage position in the first line; and in response to the second indicator indicating that the second line was not written to while access to the storage device was lost, refraining from obtaining a second mapping of storage positions in the second line.

12. The electronic environment of claim 10, further comprising:

after losing access to the storage device that provides storage to the storage extent, assigning a first priority level to the storage extent and a second priority level to a second storage extent in which the storage device does not provide storage, the first priority level and the second priority level indicating respective write priorities of the storage extent and the second storage extent to store write data, the first priority level being less than the second priority level; and after a number of unused lines in the second storage extent falls below a predetermined threshold, selecting the first line of the storage extent for the degraded write operation.

13. The electronic environment of claim 10 wherein performing the degraded write operation includes:

obtaining a first position bitmap of the first line from a virtual data structure mapped to the first line to identify physical storage positions of the first line; and after writing the data to the first line, updating the first position bitmap and a second position bitmap of the first line to indicate that a position of the first line is degraded, the second position bitmap being included in a descriptor of the first line separate from the virtual data structure; and wherein performing the resiliency operation includes:

in response to the first indicator indicating that the first line was written to while access to the storage device was lost, obtaining the second position bitmap from the descriptor of the first line to identify the position of the first line as degraded.

14. The electronic environment of claim 13, wherein the descriptor of the first line includes a plurality of pointers to a respective plurality of virtual data structures mapped to the first line, the respective plurality of virtual data structures including the virtual data structure; and wherein obtaining the second position bitmap includes:

accessing the second position bitmap in the descriptor of the first line to construct the additional data for the plurality of virtual data structures mapped to the first line.

15. The electronic environment of claim 13 wherein performing the resiliency operation further includes:

after regaining access to the position of the first line, updating the first position bitmap in the virtual data structure and the second position bitmap in the descriptor of the first line to indicate that access to the position of the first line has been regained.

16. The electronic environment of claim 10 wherein updating the first generation identifier occurs after writing the data to the first line.

17. The electronic environment of claim 16 wherein performing the resiliency operation includes:

in response to the first indicator indicating that the first line was written to while access to the storage device was lost, performing an assessment operation to that compares the first generation identifier and the third generation identifier to confirm data consistency; and in response to the assessment operation confirming data consistency, constructing the additional data from the data written in the first line of the storage extent.

18. The electronic environment of claim 16 further comprising:

in response to receiving a read request, performing an assessment operation that compares the first generation identifier and the second generation identifier to confirm data consistency; and in response to the assessment operation confirming data consistency, reading data from the first line.

19. A computer program product having a non-transitory computer readable medium that stores a set of instructions to provide data storage resiliency, the set of instructions, when carried out by computerized circuitry, causes the computerized circuitry to perform a method of:

after losing access to a storage device that provides storage to a storage extent, performing a degraded write operation that writes data to a first line of the storage extent;

setting a first indicator to indicate that the first line was written to while access to the storage device was lost and while a second indicator continues to indicate that a second line of the storage extent was not written to; and after regaining access to the storage device and in response to the first indicator indicating that the first line was written to in the degraded write operation, performing a resiliency operation that constructs additional data from the data written in the first line to increase data storage resiliency of the storage extent;

wherein performing the degraded write operation includes:
    updating a first generation identifier of the first line to indicate that the data stored in the first line has changed; and
    sending an instruction to update a second generation identifier and a third generation identifier, the second generation identifier being stored in a virtual data structure mapped to the first line, the third generation identifier being stored in a descriptor of the first line separate from the virtual data structure.

20. The method of claim 1 wherein the first indicator and the second indicator are included in a first bitmap which identifies degraded storage positions in the storage extent; and
    wherein the method further includes:
        directing an update to a second bitmap and a third bitmap, the second bitmap being stored in the virtual data structure, the third bitmap being stored in the descriptor, the second bitmap and the third bitmap matching the first bitmap.

\* \* \* \* \*